United States Patent [19]
Calicchia et al.

[11] 3,783,147
[45] Jan. 1, 1974

[54] REMOVAL OF CATALYST RESIDUE FROM POLYPHENYLENE ETHERS

[75] Inventors: David J. Calicchia, Stillwater; Michael M. Modan, Albany, both of N.Y.

[73] Assignee: General Electric Company, Pittsfield, Mass.

[22] Filed: Sept. 24, 1971

[21] Appl. No.: 183,321

[52] U.S. Cl............................ 260/47 ET, 260/583 N
[51] Int. Cl............................................. C08g 23/18
[58] Field of Search................................. 260/47 ET

[56] References Cited
UNITED STATES PATENTS
3,630,995  12/1971  Modan.................................. 55/33

Primary Examiner—Melvin Goldstein
Attorney—William F. Mufatti et al.

[57] ABSTRACT

A method is provided for the separation and recovery of metal-amine complex catalyst residues in a process for the formation of polyphenylene ethers by an oxidative coupling polymerization reaction. The method comprises extracting the catalyst residues by contact of the reaction solution with carbonic acid solution, batchwise, or continuously in a cascade of mixers-settlers or a liquid-liquid extraction column.

14 Claims, 1 Drawing Figure

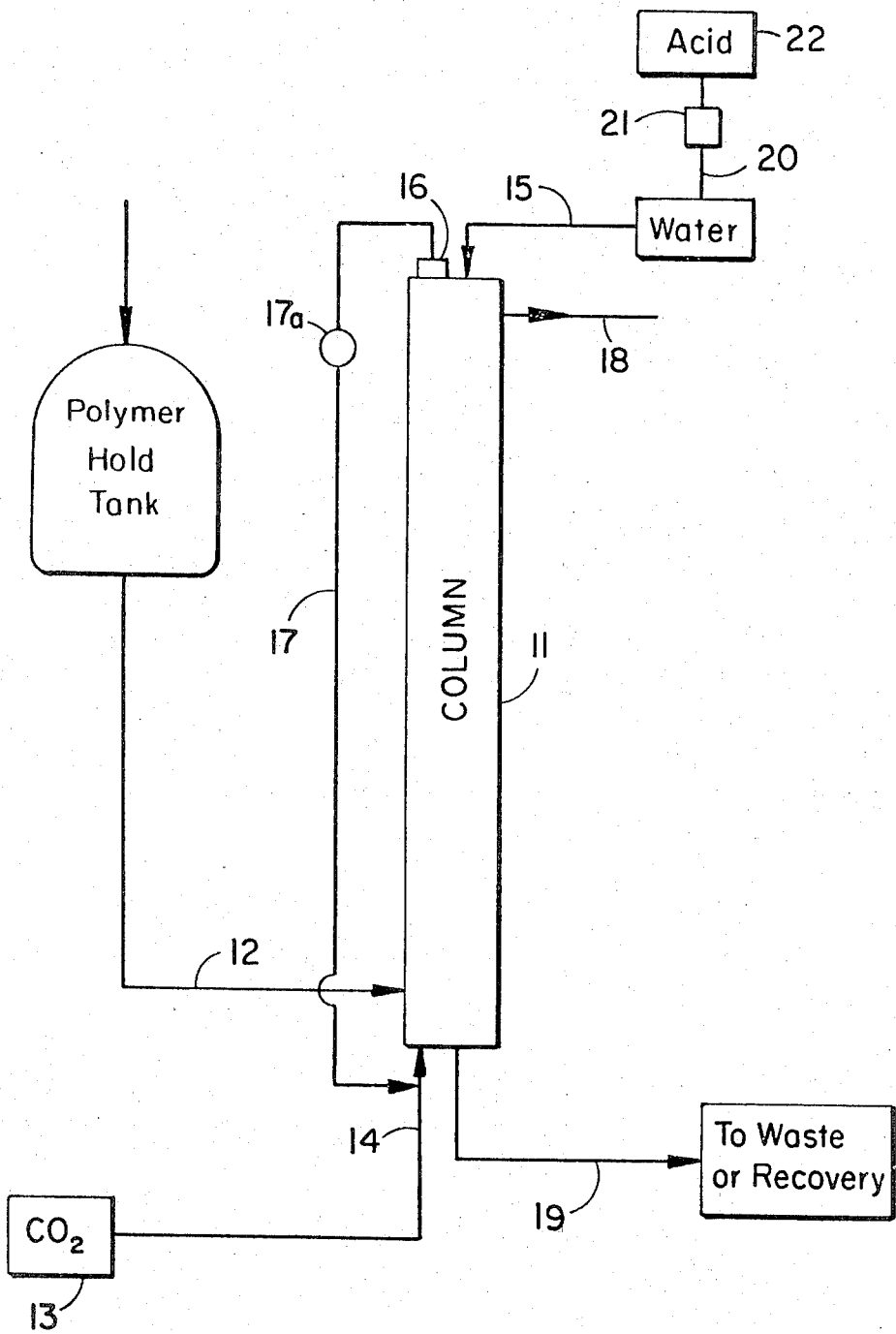

REMOVAL OF CATALYST RESIDUE FROM POLYPHENYLENE ETHERS

This invention relates to synthetic resins formed from phenols, and more particularly, to separation and recovery of catalyst residues from a reaction solution in the formation of polyphenylene ethers.

BACKGROUND OF THE INVENTION

The polyphenylene ethers and processes for their formation are known in the art and described in numerous publications including U.S. Pat. Nos. 3,306,874 and 3,306,875 of Allan S. Hay, incorporated herein by reference.

The process of Hay U.S. Pat. No. 3,306,875 involves the self-condensation of a monovalent phenolic precursor using a catalyst comprising a tertiary amine-cupric salt complex. The phenols which may be polymerized by the process correspond to the following structural formula:

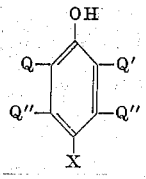

where X is a substituent selected from the group consisting of hydrogen, chlorine, bromine and iodien; Q is a monovalent substituent selected from the group consisting of hydrogen; hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus; $Q'$ and $Q''$ are the same as Q and in addition, halogen, with the proviso that Q, $Q'$ and $Q''$ are all free of a tertiary alpha-carbon atom. Besides copper, other metals which may be used in the metal-amine complex catalyst are manganese, cobalt, nickel, vanadium, chromium and the like.

Polymers formed from such phenols will correspond to the following structural formula:

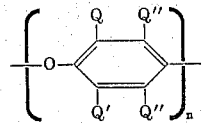

where the oxygen ether atom of one repeating unit is connected to the phenylene nucleus of the next repeating unit; Q, $Q'$ and $Q''$ are as above defined; and n is a whole integer equal to at least 50.

The process of Hay U.S. Pat. No. 3,306,874 is similar to that of U.S. Pat. No. 3,306,875, but employs primary and secondary amines in place of tertiary amines in the formation of the complex catalyst.

In accordance with the processes of the prior art, the polymerization reaction may be terminated by destroying the catalyst system, for example, by the addition of an acid, such as a mineral acid, e.g., hydrochloric acid or sulfuric acid; an organic acid, e.g., acetic acid; or a base, e.g., lime, sodium hydroxide, potassium hydroxide and the like, which react with the complex of the amine and metal salt destroying the same. Alternatively, the polymer product can be removed from the catalyst either by filtering off the product if it precipitates during the polymerization reaction, or by pouring the reaction mixture into a material which is a solvent for the catalyst system, but a non-solvent for the product. On the other hand, the metal may be precipitated as an insoluble compound and filtered from the solution. As a further alternative, the solution may be passed over an active adsorbant to remove the catalyst and other by-products leaving the polymer in solution.

From the commercial standpoint, the most economical method for terminating the polymerization reaction involves destroyin the catalyst system with an acid. In the past, this has been accomplished using various methods including mixing the acid with the polymer solution in a tank followed by absorption of the acid containing the catalyst residue in a material such as a filter aid. alternatively the mixture of the acid and the reaction solution can be transferred to a centrifuge where two phases form, and these are separated from each other. Though such methods are more economical than the other methods noted above, the conventional processes are still costly since approximately 35 pounds of acid are required per 100 pounds of polymer formed. Moreover, insufficient amine is removed from the polymer solution using these methods and this can lead to problems in some applications.

In copending, commonly assigned application Ser. No. 11,747, filed Feb. 16, 1970, and now U.S. Pat. No. 3,630,995, there is described a method to terminate the reaction and extract the catalyst residues from such polymerization mixtures by continuous countercurrent extraction against an aqueous acid stream. Although the process is very advantageous and uses less acid than before, the acids used are all stronger and more expensive than carbonic acid and the valuable by-product amine can only be recovered by raising the pH of the effluent acid stream with a base stronger than the amine. Moreover, in some cases, residual mineral acid remaining in the polymer product tneds to lead to the formation of color bodies in the polymers and these can cause problems in some applications.

It has now been discovered that carbon dioxide and water provide a uniquely advantageous mixture to terminate the polymerization reaction and recover the catalyst residues. Such mixtures are more economical to prepare, less corrosive to process equipment, and cause no color problems in the product, in comparison with the prior art reagents. Most advantageously, after separation from the polymer mixtures, such solutions need only be heated to distill off the carbon dioxide (some of which is bound into an amine-carbonate salt) and liberate the amine. If the amine is relatively insoluble in water, e.g., di-n-butylamine, it will separate into a layer which may be recovered. Thus, the need to raise the pH of the effluent to recover the amine is obviated in the present process.

DESCRIPTION OF THE DRAWING

The drawing illustrates, in flow diagram form, an apparatus in which the present process may be practiced.

DESCRIPTION OF THE INVENTION

According to the present invention, in a process for forming a polyphenylene ether by an oxidative coupling reaction in the pressure of a metal-amine complex catalyst by passing an oxygen containing gas through a reaction solution of a phenol and the catalyst, there is provided an improvement which comprises carrying out the polymerization reaction in a solution capable of liquid-liquid aqueous extraction and terminating the reaction and separating the metal-amine catalyst residue from the reaction solution by contacting the reaction solution with water and carbon dioxide.

Thus, the present invention provides a new method for extracting catalyst residues, and yields an essentially amine-free polymer solution with the advantages outlined above. The method may be employed batchwise in a stirred tank or continuously in a cascade of mixers-settlers or an extraction column. When the process is conducted batchwise, the polymer solution can be mixed with water. Then carbon dioxide, or a gas which contains carbon dioxide, is bubbled through the mixture. In the continuous process, e.g., in a column, polymer solution and carbon dioxide may be fed co-currently at the bottom of the column while water is fed at the top. The essentially catalyst-free polymer solution leaves the top of the column while the catalyst concentrates in the aqueous phase which is removed from the lower part of the column. In either case, operation under higher than atomospheric pressure is advantageous, due to the higher solubility of carbon dioxide.

The polymer solution used in the invention can be formed, for example, by passing an oxygen-containing gas through a solution containing a phenolic monomer and the catalyst formed from the amine and metal, e.g., copper, salt dissolved in a solvent. The process is broadly applicable to all of the phenols disclosed in the above-noted Hay patents, but preferably is used with polymers from phenols corresponding to the following formula:

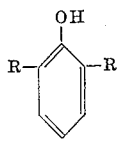

where each R represents a hydrocarbon radical, preferably having from one to eight carbon atoms. Examples of preferred polymers are those from phenols such as 2,6-dimethylphenol, 2,6-diethylphenol, 2-methyl-6-ethyl phenol, 2,6-dibutyl phenol, 2-methyl-6-propyl phenol, 2-methyl-6-phenyl phenol and 2-methyl-6-allyl phenol. The most preferred polymer is poly(2,6-dimethyl-1,4-phenylene)-ether, which is prepared from 2,6-dimethyl phenol.

The primary or secondary amine component of the catalyst complex can correspond to those disclosed in above-noted U.S. Pat. No. 3,306,874 while the tertiary amine component of the catalyst complex can correspond to those disclosed in the above-noted U.S. Pat. No. 3,306,875. Representative examples of suitable amines include aliphatic amines including cycloaliphatic amines where the cycloaliphatic group is substituted on the amine nitrogen, for example, mono-, di-, and tripropyl amine; mono- and dibutyl amine; mono- and di-secondary propyl amine; mono-, di-, and tricyclohexylamine; ethylmethyl amine; diethylmethyl amine; morpholine; methylcyclohexylamine; N,N'-dialkylethylene diamines; N,N',N-trialkylethylene diamine; the N,N'-dialkyl propane diamines; the N,N,N'-trialkylpentane diamines, and the like.

Among the metal salts suitable for the process are copper, manganese, cobalt, nickel, vanadium, chromium salts and the like. Typical examples of copper salts include cuprous chloride, cupric chloride, cupric bromide, cuprous sulphate, cupric sulphate, cupric azide, cupric tetraamine sulphate, cuprous acetate, cupric acetate, cupric butyrate, cupric toluate and the like.

Additional examples of suitable amines and metal salts, as well as concentration limits and reaction parameters, may be found in the above-noted U.S. Pat. No. 3,306,874, U.S. Pat. No. 3,306,875 incorporated herein by reference, and in other patents.

It should be noted that, in addition to the processes disclosed in the above two referenced Hay patents, the process of the subject invention is also applicable to reaction solutions from the oxidative coupling polymerization reactions disclosed in commonly-assigned U.S. patent applications Ser. Nos. 807,047; 807,076; 807,126; and 849,508, all incorporated herein by reference and, generally, to any other processes for the formation of polyphenylene ethers using a metal-amine complex catalyst system for the oxidative coupling polymerization reaction.

The solvent for the reaction stream may be any of the water immiscible solvents described in the aforesaid patents of Hay, but aromatic solvents such as benzene, toluene and xylene are preferred.

At the point where polymer build-up reaches a desired end point, the product stream comprises a solution of polymer, typically in an amount from 2 to 15 percent by weight, metal and amine catalyst residue, typically in amounts of from 0.5 to 2.0 percent by weight amine and from 0.1 to 1.5 percent metal, and minor amounts of other materials such as various promoters, unreacted monomer and the like.

In the batch process, according to this invention, the polymer solution is mixed with 10 to 100 percent (by volume) of water which optionally may contain 0–30 percent by weight of an acid such as nitric, sulfuric, hydrochloric or acetic. If present, the preferred acid content is 10–30 percent by weight. Then carbon dioxide, or a gas containing carbon dioxide, is bubbled through the mixture under vigorous agitation. The carbon dioxide is bubbled through the mixture until it is saturated. A rate of from about 0.5 to about 50 SCFM for about 1–30 minutes may be employed. In large scale operation this may be increased proportionally. The saturation concentration of carbon dioxide in water at 25°C is 0.13 g./100 g. of water which corresponds to 0.003 moles of $H_2CO_3$/100 g. of water. Preferably, for most efficient contact, the carbon dioxide and/or the water are introduced at the bottom of the polymerization reaction solution. The amine catalyst forms a complex with the carbonic acid, and this is highly soluble in the aqueous phase. As the complex is formed with the carbon dioxide in solution, it allows fresh carbon dioxide to dissolve and therefore the complex of the catalyst and carbon dioxide may be obtained in as high a concentration as 0.1 g. mole/100 g. As has been mentioned the carbon dioxide can also be introduced under pressure to increase solubility.

The amine component of the catalyst forms a carbonate which is easily separated and may be thermally decomposed. This is done by collecting the catalyst in a vessel and distilling the mixture. The carbonate salt is decomposed salt is decomposed and the carbon dioxide is driven off. The azeotrope in the case of dibutylamine boils off at 96°–98°C. The product is then allowed to settle whereupon the water insoluble amine will separate and may be recovered easily.

In the continuous process according to this invention, a suitable column is used in which the polymer solution and the carbon dioxide are fed co-currently at the bottom of the column and water is fed at the top. Optionally the water may contain 0-30 percent by weight of an acid such as nitric, sulfuric, hydrochloric or acetic. If present, the preferred acid content is 10-30 percent by weight. The carbon dioxide is bubbled continuously at a rate of about 0.5 to about 50 SCFM. In larger scale operations this may be increased proportionately. The ratio of the organic phase or reaction solution to the aqueous phase may vary between 50:1 and 1:1. When the proper mass transjer length is provided, an essentially catalyst-free polymer solution leaves the top of the column while the catalyst concentrates in the aqueous phase, and this is withdrawn from the bottom. Any suitable device may be used at the top of the column to trap and recirculate the undissolved carbon dioxide. The effectiveness of the removal of the metal-amine catalyst can be measured by the amount of amine left in the polymer solution after separation. Therefore, the experimental results are expressed in terms of the amine concentrates. It is similarly advantageous to operate under pressures higher than atmsopheric due to the increased solubility of carbon dioxide.

Referring to the drawing, a reaction solution from a reactor (not shown) containing metal-amine catalyst residue and polymer is pumped to holding tank 10 and transferred continuously to column 11 through conduit 12. Carbon dioxide is fed frommstorage tank 13 to the bottom of column 11 through conduit 14. Water is fed to the top of column 11 through conduit 15. The column may be equipped with gas collecting device 16 and carbon dioxide collected therein may be recycled to the lower carbon dioxide inlet 14 through a suitable recycling conduit 17. Essentially catalyst-free polymer is removed through outlet 18 at the top of column 11 while the catalyst residue-containing aqueous phase is withdrawn at the bottom of the column through outlet 19. The polymer may then be recovered from its reaction solution by any convenient means known in the art such as by precipitation with a non-solvent for the polymer such as methanol. When it is desired to add an acid to the water employed in the countercurrent liquid-liquid extraction column, it can be conveniently done by means of conduit 20 equipped with metering device 21 and supplied from acid storage tank 22.

DESCRIPTION OF THE PREFERRED EMBODIMENTS

The following examples are added to illustrate but not to limit the scope of the invention

EXAMPLE 1

1,000 ml. of a poly(2,6-dimethyl-1,4-phenylene)ether reaction solution in toluene containing 2.34 g./100 g. of dibutyl-amine, copper ion and 15 g. of water is placed in a reaction tank. To this mixture is added 300 g. of water an then carbon dioxide is bubbled through for 10 minutes at the rate of 1 standard cubic foot per minute (SCFM). The aqueous phase is separated, weighs 335 g., and contains 7.3 g./100 g. of dibytylamine. The polymer solution is assayed and is found to contain 0.5 g./100 g. of dibutylamine and the pH is 7.9. Substantially all of the copper has been removed.

EXAMPLE 2

The following describes a procedure whereby the present process is carried out in a continuous manner in an apparatus of the type shown in the drawing.

A polymer feed solution containing from about 1.0 to 2.0 percent di-n-butyl amine, from about 0.1 to 0.2 percent copper (as copper oxide) and about 9 percent of poly(2,6-dimethyl-1,4-phenylene)ether, all dissolved in toluene, is fed into a six inch column packed with porcelain saddles. The polymer feed solution is transferred to the bottom of the column and carbon dioxide is also passed into the bottom of the column. Water is metered into the top of the column. Essentially catalyst-free polymer leaves the top of the column and the aqueous phase containing the catalyst is withdrawn from the bottom.

The aqueous phase is collected in a vessel and heated, then distilled. Carbon dioxide boils off, then the amine water azeotrope distills at 96°-98°C. The distillate is allowed to separate and the di-n-butylamine is recovered. It is sufficiently pure to be used as a catalyst component in subsequent polymerization reactions.

EXAMPLE 3

The following describes a procedure whereby the present process is carried out in a continuous manner in a stirred apparatus of the type shown in the drawing.

A polymer feed solution containing from about 1.0 to 2 percent di-n-butyl amine, from about 0.1 to 0.2 percent copper (as copper oxide) and about 10 percent of poly(2,6-dimentyl-1,4-phenylene)ether, all dissolved in benzene is fed into a six inch Mixco-type column equipped with an agitator through the center of the column. The agitator speed is 250 rpm. Polymer feed solution is transferred into the bottom of the column and carbon dioxide is also passed into the bottom of the column. Water containing 15 percent hydrochloric acid by weight is metered into the top of the column. Essentially catalyst-free polymer leaves at the top of the column and the aqueous phase containing the catalyst is withdrawn from the bottom. The product is recovered by precipitation with methanol. The amine is recovered by heating and distilling as described in Example 2.

The invention in its broader aspects is not limited to the specification, methods, steps and improvements shown and described herein, but departures may be made within the scope of the accompanying claims without departing from the principles of the invention and without sacrificing its chief advantages.

We claim:

1. In a process for forming a polyphenylene ether by an oxidative coupling reaction in the presence of a metal-amine complex catalyst comprising passing an oxygen-containing gas through a reaction solution of a phenol and said metal-amine catalyst, the improvement which comprises carrying out the polymerization reaction in a solution capable of liquid-liquid aqueous extraction and terminating the reaction and separating the metalamine catalyst residue from said reaction solution by contacting said reaction solution with water and carbon dioxide.

2. A process as defined in claim 1 wherein the metal in the metal-amine complex catalyst is copper.

3. A process as defined in claim 1 wherein the reaction is terminated and extraction is carried out batchwise with the water and carbon dioxide both being introduced at the bottom of the reaction solution.

4. A process as defined in claim 1 wherein the reaction is terminated and extraction is carried out continuously in a countercurrent liquid-liquid extraction column wherein the polymer reaction solution and carbon dioxide are introduced at the bottom of the column and water is introduced at the top of the column 5. A process as defined in claim 4 wherein the water is acidified with an acid of higher acid strength than carbonic acid.

6. A process as defined in claim 5 wherein the water is acidified with an acid selected from the group consisting of hydrochloric acid, nitric acid, sulfuric acid and acetic acid.

7. A process as defined in claim 1 wherein the reaction solution comprises a phenol, a metal-amine catalyst and an aromatic solvent.

8. A process as defined in claim 7 wherein the aromatic solvent is selected from the group consisting of benzene, toluene and xylene.

9. A process as defined in claim 3 wherein the polymerization reaction solution is contacted with from about 10 to 100 percent by volume of water.

10. A process as defined in claim 1 wherein the polyphenylene ether is a poly(2,6-dimethyl-1,4-phenylene)ether having at least 50 repeating units. ce 11. A process as defined in claim 5 wherein the acid is employed at a concentration of from 10 to 30 percent by weight.

12. A process as defined in claim 1 wherein the amine is relatively insoluble in water including the subsequent steps of separating the aqueous carbon dioxide solution after contacting with the polymerization mixture, heating said solution until substantially all of the carbon dioxide has been distilled off, allowing the resulting mixture to separate into an aqueous layer and an amine layer and recovering the amine layer.

13. A process as defined in claim 12 wherein the amine is di-n-butyl amine.

14. A process as defined in claim 12 wherein the metal in the complex catalyst is copper.

* * * * *